July 28, 1942.   J. P. JOHNSON   2,291,578
HYDRAULIC EQUALIZER
Filed May 13, 1939   2 Sheets-Sheet 1

INVENTOR.
JAMES P. JOHNSON
BY
ATTORNEY.

July 28, 1942.  J. P. JOHNSON  2,291,578

HYDRAULIC EQUALIZER

Filed May 13, 1939  2 Sheets-Sheet 2

INVENTOR.
JAMES P. JOHNSON
BY
ATTORNEY.

Patented July 28, 1942

2,291,578

UNITED STATES PATENT OFFICE 2,291,578

HYDRAULIC EQUALIZER

James P. Johnson, Shaker Heights, Ohio, assignor to Pump Engineering Service Corporation, Cleveland, Ohio, a corporation of Ohio Application May 13, 1939, Serial No. 273,567

5 Claims. (Cl. 137—166)

The present invention has to do with a fluid metering device capable of handling an introduced fluid at varying pressures and effecting its discharge at a plurality of points in equal quantities regardless of the pressure of the introduced fluid.

The metering device as designed is especially useful in connection with the operation of retractable "landing gears," including flaps and like mechanisms where simultaneous and uniform operation is essential. Heretofore, in hydraulically actuated mechanisms of this type oil from a single source was supplied to a pair of such mechanisms for simultaneous operation. If one mechanism operated more freely than the other it will be seen that one will operate ahead of the other which condition, especially in retractable landing gears, is of serious consequence. It is therefore, an object of the present invention to provide a metering device adapted to receive oil under pressure from a single source and to discharge the same in equal quantities at a plurality of points whereby the mechanisms connected to the respective outlets are operated simultaneously and uniformly regardless of variations in pressure of the introduced oil.

Another object of the present invention is to provide a fluid metering device of compact and light weight structure and adapted for mounting wherever desired thus eliminating or minimizing pipe lines etc., which is a desirable factor in aircraft design.

Another object of the present invention is to provide a metering device of unit arrangement thus adapting the device to various uses and conditions.

Another object of the present invention is to provide a device which is simple in construction, efficient in operation and inexpensive to manufacture.

With the objects above indicated, and other objects hereinafter explained in view, my invention consists in the construction and combination of elements hereinafter described and claimed.

Referring to the drawings.

Figure 1:
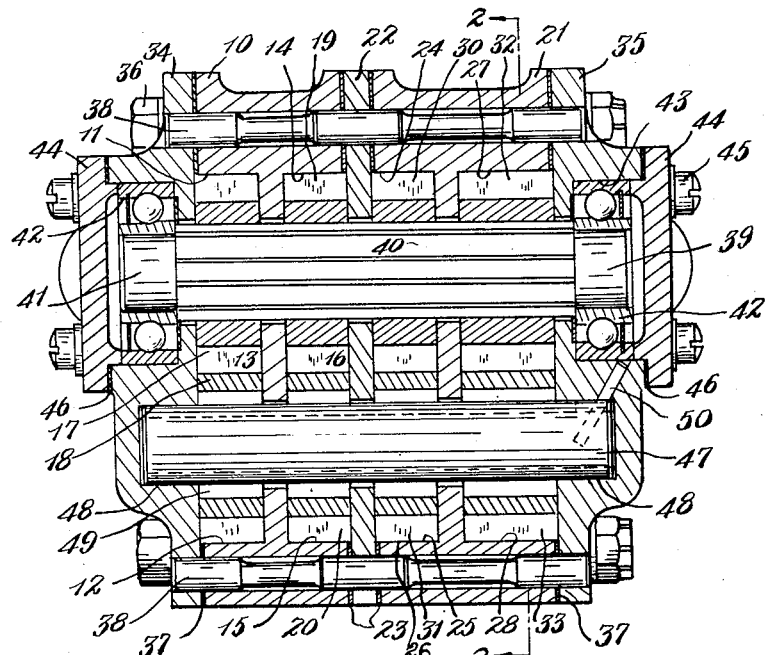
Figure 1 is a vertical sectional view taken on line 1—1 in Figure 2, of a metering device or equalizer embodying the present invention.

In the drawings, I have illustrated a fluid metering device in its preferred form of an hydraulic equalizer for the reason that many desirable features are embodied in the latter due to its simplified structure. The invention is not, however, to be limited thereto but may be otherwise incorporated as will be obvious to those skilled in the art.

Figure 2:
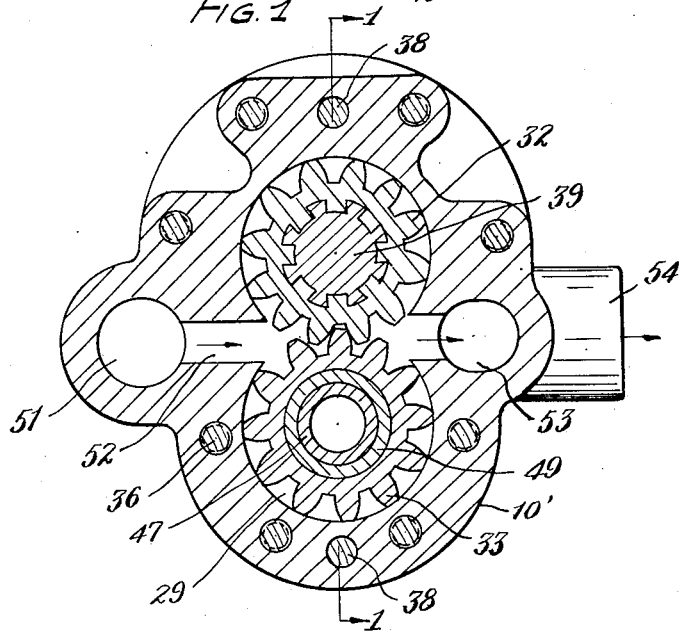
Figure 2 is a transverse sectional view taken on line 2—2 in Figure 1 and showing further details of the metering device.

The equalizer comprises a unit 10 of aluminum or other light weight material initially in the form of a solid block and of generally elongated section, as more clearly shown in Figures 1 and 2. The unit 10 has a circular bore 11 extending inwardly from its outer face and a similar circular bore 12 extending inwardly from its outer face, the adjacent portions of the bores 11 and 12 being in overlapping relation to provide a pump chamber 13. The unit 10 is further provided with a circular bore 14 extending inwardly from its inner face and a similar circular bore 15 extending inwardly from its inner face, the adjacent portions of the bores 14 and 15 being relatively overlapping to provide a fluid chamber 16 in non-communicating relation with respect to the chamber 13. An external gear 17 is rotatably disposed within the bore 11 and an external gear 18 is rotatably disposed within the bore 12, the gears being in meshing engagement whereby one may be driven by the other. An external gear 19 is rotatably disposed in the bore 14 and an external gear 20 is similarly disposed in the bore 15, these gears being in meshing engagement so that one may be driven by the other. It is further to be noted that in this particular instance the meshing gears 17 and 18 and the meshing gears 19 and 20 have the same fluid displacement for a purpose to be later described.

A unit 21 similar to the unit 10 is spaced therefrom longitudinally by a spacer member 22 which extends transversely between the adjacent ends of the units and a pair of gaskets 23 effectively seal the adjacent surfaces against the escape of the fluid within the fluid chambers. The unit 21 has a circular bore 24 extending inwardly from its inner face and a similar bore 25 likewise extending inwardly from its inner face, the adjacent portions of the bores being in overlapping relation so as to provide a fluid chamber 26. The unit 21 is further provided with a circular bore 27 extending inwardly from its outer face and a similar bore 28 also extending inwardly from its outer face, the adjacent portions of the bores being in overlapping relation to provide a fluid chamber 29. The fluid chambers 26 and 29 in this instance likewise do not communicate with one another nor with the fluid chambers 13 and 16 in the unit 10. An external gear 30 is rotatably disposed within the bore 24 and an external gear 31 is rotatably disposed within the bore 25, the gears being in meshing engagement so that one may be driven by the other. An external gear 32 is rotatably disposed in the bore 27 and an external gear 33 is rotatably disposed in the bore 28, these gears likewise being in meshing engagement so that one may be driven by the other. It should be noted in this instance that where different displacements are desired this can be efficiently provided by merely increasing the length of one of the gears, such as the gear 32 in Figure 1. Therefore, the meshing gears 32 and 33 will have a greater fluid displacement than the meshing gears 30 and 31 in the unit 21 and it will be observed that the difference in displacement may be infinitely varied without increasing the diameter of the gears.

A pair of end plates 34 and 35 are disposed upon the outer ends of the units 10 and 21 respectively and are detachably connected thereto by a plurality of bolts 36 which extend through aligned openings provided in the intermediate members. A pair of gaskets 37 are disposed between the end plates and the adjacent units so as to provide a fluid tight joint. Aligning pins 38 extend through aligned openings provided in the end plates, the units and the spacer for properly positioning the members during assembly and the length of the pins will, of course, vary depending upon the number of units desired.

The gears 17, 19, 30 and 32 have openings extending axially therethrough to accommodate a driven shaft 39, the gears and shaft being drivingly connected by cooperating splines 40 or any other suitable means for imparting unitary rotation. The opposite ends of the driven shaft 39 project through openings in the adjacent end plates and have reduced extensions 41 rotatably mounted in anti-friction bearings 42 seated in bores 43 on the outer sides of the end plates as more clearly shown in Figure 1. Caps 44 extend across the bores 43 to retain the bearings in proper position and are detachably connected to the adjacent end plates by a plurality of bolts 45. Gaskets 46 are disposed between the caps and adjacent end plates to provide an effective seal against the leakage of fluid. It will be noted that in this particular instance all of the gears rotate uniformly with the driven shaft 39 because each is drivingly connected therewith.

The gears 18, 20, 31 and 33 have axially aligned openings to accommodate a stationary shaft 47 the ends of which are mounted in aligned bores 48 provided upon the inner faces of the adjacent end plates. Bushings 49 are disposed between the shaft 47 and the adjacent gears to reduce frictional resistance in their relative rotation, in this instance the gears being freely rotatable about the stationary shaft 47 and each being rotated by engagement with their cooperating meshing driving gear. A pin 50 is mounted in the end plate 35 and has one end projecting through an opening in the adjacent end of the stationary shaft 47 to prevent rotation of the latter.

A fluid inlet opening 51 extends through the end plate 34, the unit 10, the spacer 22 and the unit 21 and each unit has a pair of passageways 52 affording communication between the inlet opening 51 and each pair of meshing gears whereby, upon the introduction of fluid under pressure, rotation is imparted to the gears 17, 19, 30 and 32 which in turn impart rotation to their respective meshing gear. Each unit is likewise provided with non-communicating passageways 53 each of which communicates at one end with a pair of meshing gears, as shown in Figure 2, and at the other end with a pair of outlet openings 54. In this manner the fluid is discharged by each pair of cooperating gears through its respective passageway 53 and its communicating outlet opening 54 in quantity directly proportional to the displacement of the gears. It will be noted that the equalizer has a single inlet opening for the admission of fluid under pressure and that the fluid is divided into a minimum of two outlets of equal volume so that the fluid discharged will be unaffected by variations in the pressure of the introduced fluid.

Figure 3:
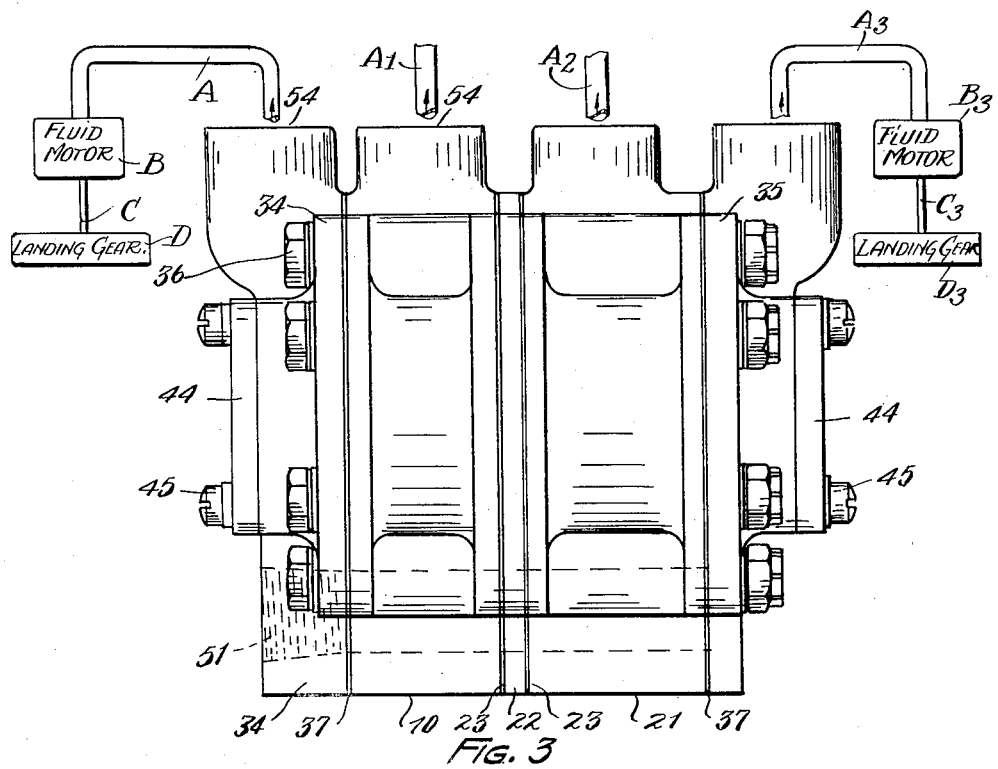
Figure 3 is a top plan view of the metering device housing showing the fluid inlet opening and plurality of outlet openings.

Figures 1 to 3 inclusive show the equalizer as including two units 10 and 21, but it should be understood that the unit 21 can be eliminated and the end plate 35 connected directly to the outer face of the unit 10 to provide a single unit equalizer where desired or the end plate 35 may be removed and any number of additional units may be added to the ones shown. Where a different relative displacement between the gears of a unit is desired one of the gears may be made of greater length depending upon the displacement required.

In the installation and operation of the device, the intake opening 51 is connected with the discharge end of an oil supply line under pressure while the outlet openings 54 of the unit 10 are each independently connected to one of a pair of landing gear mechanisms the simultaneous and uniform operation of which is desired. As the oil under pressure passes through the inlet opening 51 and passageways 52 it contacts the pairs of meshing gears 17—18 and 19—20 imparting rotation thereto at uniform rates due to the fact that the gears 17 and 19 are drivingly connected to the shaft 39. The rotation of these gears causes the oil to be discharged through the passageways 53 and out through the two outlet openings 54 in equal volume. The discharged oil from the two outlet openings is conveyed respectively to their associated landing gear mechanism thus causing the latter to operate simultaneously and uniformly irrespective of variations in the pressure of the introduced oil. Since these instrumentalities, to which it is important to impart duplicate movement, may take a number of forms, the same have been indicated in Fig. 3 schematically. Separate fluid lines A and A3 lead from the plural outlet ports of the distributor to separate remotely located fluid responsive motors B and B3 operating through connecting means C and C3, separate landing gears D and D3. It is important that the separate landing gears D and D3 have duplicate movement imparted thereto and this is accomplished by the fact that quantities of fluid are delivered to fluid motors B and B3 in exact proportion to their relative displacements. It will be apparent that other commonly known remotely located instrumentalities such for example as aircraft landing flaps may be similarly operated by fluid motors B and B3.

Figure 4:
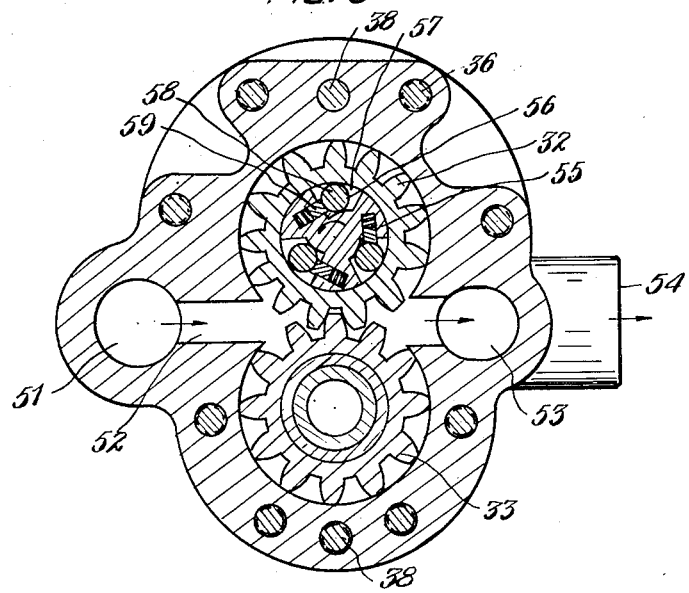
Figure 4 is a transverse sectional view similar to Figure 2 but showing a modification of the invention.

In the event that one of the mechanisms to which the equalizer is adapted for connection should become inoperative, a back pressure of the fluid would be created in one of the discharge lines connected to one of the outlet openings 54. With the construction shown in Figure 2 and that heretofore described, this condition might interfere with the proper operation of the equalizer and, therefore, instead of mounting the gears on the splined shaft 39, a driven shaft 55 is substituted in place thereof, which is more clearly shown in Figure 4. In this instance the shaft and adjacent gear are drivingly connected by means of oneway clutch members indicated generally at 56 which cooperate between the gears and shaft so as to positively effect rotation in unison in the direction indicated by the arrow. Cam slots 57 are formed in the outer surface of the shaft, there being three for each gear, as shown in Figure 4 although not so limited. Balls or rollers 58 are disposed within the cam slots and spring pressed plungers 59 exert an outward pressure against the rollers 58 which frictionally connects the gear and shaft for rotation in unison. In the event of the inoperativeness of one of the mechanisms, as before referred to, the built up pressure is relieved by the independent slippage of the gear without affecting unitary rotation of the other gears and their relative discharge of fluid. While gears have been described as the metering means for the fluid, it will be obvious that other means may be adopted where found to be more effective and their use is not therefore, to be so restricted.

While I have described the preferred embodiment of the invention, it is to be understood that I am not to be limited thereto inasmuch as changes and modifications may be resorted to without departing from the spirit of the invention as defined in the appended claims.

What is claimed is:

1. A fluid metering device comprising a housing having a single fluid inlet opening adapted to receive fluid under pressure and a plurality of outlet ports adapted to deliver to independent fluid pressure responsive instrumentalities, said housing being provided with a corresponding plurality of non-communicating fluid chambers in common communication with said inlet opening and each in communication with a different outlet port, means in each of said chambers defining therewith a hydraulic motor of predetermined displacement, means connecting said motors for operation in unison, whereby the introduced fluid is effective to drive said motors and is discharged through said separate outlet ports in respective volumes proportional to the displacement of the corresponding motors.

2. A fluid metering device comprising a housing having a single fluid inlet opening adapted to receive fluid under pressure and a plurality of outlet ports adapted to deliver to independent fluid pressure responsive instrumentalities, said housing being provided with a corresponding plurality of non-communicating fluid chambers in common communication with said inlet opening and each in communication with a different outlet port, pairs of meshing gears rotatably disposed in said fluid chambers, and a common shaft connecting said gears for rotation in unison whereby the introduced fluid drives said pairs of gears and is discharged through said separate outlet ports in respective volumes proportional to the displacement of said corresponding pairs of gears.

3. The combination of a plurality of independent fluid responsive motors and means for supplying fluid thereto, comprising a housing having a common fluid inlet opening adapted to receive fluid under pressure from an external source and a plurality of outlet ports communicating with said respective motors, said housing being provided with a plurality of separate fluid chambers in common communication on one side with said inlet opening and each in communication on the other side with a different outlet port, a pair of meshing gears rotatably disposed in each of said fluid chambers arranged to be driven by said fluid from said external source only, and means connecting said pairs of gears for rotation in unison whereby the introduced fluid is discharged through said separate outlet ports to said motors in volumes substantially proportional to the displacement of said gears to cause duplicate movement of said motors, irrespective of limited variation in the discharge pressures of said respective outlet ports due to variations in the resistances to flow therefrom caused by variations in the resistances offered by said motors.

4. The combination with a plurality of independent fluid pressure responsive motors, of means for causing duplication of movement thereof, comprising an apparatus for dividing a fluid stream under high pressure into a plurality of separate streams of substantially predetermined fractional quantities, comprising a housing formed with a plurality of generally parallel gear receiving chambers, a corresponding number of pairs of intermeshing gears received in said chambers, said housing being formed with a common fluid inlet adapted to receive and to deliver a fluid stream under pressure to the back side of each of said pairs of gears for driving the same, said fluid pressure being the only driving means for said gears, said housing being further formed with independent outlet ports leading from the discharge side of each of said pairs of gears, and delivering to said independent fluid responsive motors, separate means operated by said motors, said respective operated means being subject to different resistances in their operation, a common shaft connecting one gear of each pair of gears with the corresponding gears of the remaining pairs of gears whereby said respective pairs of gears are driven in unison and become effective to discharge predetermined fractional quantities of said inlet stream to said motors substantially irrespective of limited variations in the respective pressures at said ports due to said different resistances.

5. The combination with a pair of separate remotely located fluid operated mechanisms and a single source of fluid under pressure, of metering means effective to divide a single fluid stream from said source into a plurality of separate fluid streams of predetermined fractional quantities and deliver the same to said fluid responsive instrumentalities to impart duplicate movement thereto, said metering means comprising a housing having a single fluid inlet opening adapted to communicate with a source of fluid under pressure and with a plurality of outlet ports adapted to deliver individual fluid streams to said fluid operated mechanisms, said housing being provided with a corresponding plurality of fluid chambers in common communication with said inlet opening and each in separate communication with different ones of said outlet ports, means in each of said chambers defining therewith a fluid motor operable in response to said fluid pressure only, said motors having predetermined relative displacements, means connecting said motors to each other for operation in unison, whereby each motor delivers a predetermined fractional quantity of said single stream to its corresponding fluid operated mechanism for imparting duplicate movement thereto irrespective of variations in the resistance to movement offered by said respective instrumentalities.

JAMES P. JOHNSON.